United States Patent [19]
Houldcroft

[11] 3,905,092
[45] Sept. 16, 1975

[54] STORAGE TANKS AND METHODS OF MANUFACTURING SUCH TANKS

[75] Inventor: Peter T. Houldcroft, Royston, England

[73] Assignee: The Welding Institute, Cambridge, England

[22] Filed: Aug. 15, 1974

[21] Appl. No.: 497,710

[30] Foreign Application Priority Data
Aug. 15, 1972 United Kingdom............... 38532/72

[52] U.S. Cl. .................... 228/173; 228/32; 219/82; 219/83; 228/184
[51] Int. Cl.² ........................................ B23K 11/06
[58] Field of Search ............... 29/471.1; 228/25, 32; 114/77 R, 79 W, 65 R; 219/82, 83

[56] References Cited
UNITED STATES PATENTS

| | | | |
|---|---|---|---|
| 2,309,208 | 1/1943 | Noble | 219/83 X |
| 2,323,316 | 7/1943 | Dieter | 114/79 W |
| 2,404,632 | 7/1946 | Hansen | 219/82 |
| 2,960,053 | 11/1960 | Meyer | 228/32 |

Primary Examiner—James L. Jones, Jr.
Assistant Examiner—K. J. Ramsey
Attorney, Agent, or Firm—Kemon, Palmer & Estabrook

[57] ABSTRACT

To form a membrane tank, for example for liquified natural gas, a reel of strip material is positioned adjacent the required tank location and a frame defining the periphery of a slice of the tank is placed within the space to be occupied by the tank. The frame carries a track for guiding a traction device to which is affixed the outer end of the reel strip and the frame also supports and guides the strip of material pulled from the reel as the traction device moves round the track. When the traction device reaches the end of the track, a seaming device moves around the frame to weld the edge of the newly pulled strip to the previously pulled strip, after which a further strip is pulled from the reel, and so on. The seaming may be effected by welding rollers located on a trolley which forms the traction device, the trolley pulling the strip from the reel on its outward journey around the tank perimeter and welding the edges of adjacent strips on its return journey after releasing the end of the pulled strip.

15 Claims, 8 Drawing Figures

STORAGE TANKS AND METHODS OF MANUFACTURING SUCH TANKS

This invention is concerned with the manufacture of tanks for the transport or storage of liquified natural gas or other liquid chemicals.

Over the last 15 years, there has been a rapid increase in the transport and storage of liquified natural gas at sub-zero temperatures. Broadly speaking, the tanks used for this purpose fall into two types. Tanks of the first type are made in traditional materials, such as aluminium or nickel steel, and are of thick plate. Tanks of the second type, known as "membrane tanks" are made of INVAR or stainless steel, the thickness of which is typically 20/1000ths of an inch. The membrane tank is backed by closely fitting insulating material to provide support for the tank.

Tanks used to store liquified natural gas are very large and therefore must be fabricated on the spot. When a tank is to be installed in a ship, it is desirable for the shape of the tank to match as closely as possible the shape of the hull, in order to make the maximum use of the space available. Consequently, such tanks are frequently of a roughly octagonal cross-section, the oblique sides being shorter than the horizontal and vertical sides.

Some membrane tanks have been made from panels of sheet material, for example of stainless steel, by a technique in which the edges of a panel are folded over to form what amounts to a shallow tray. These "trays" are then fitted together with the flanges facing inwards and the flanged edges are joined by welding. In one method, a resistance seam welding method is employed but since this method cannot be used to weld the corners of the panels it is necessary, at these corners, to change to some other form of welding, which may be tungsten arc welding. Although the membrane tank is an attractive solution to the problem of storing liquid gas, leakage problems have arisen due to defective welds and it is believed that these occur principally at the corners of the panels and are due to the complicated welding procedure required at these corners. Each joint has to be inspected separately. As an insurance against leakage from various causes including damage it has become usual to employ more than one metal layer, each layer being separated from the one inside it by insulation.

Other membrane tanks have been fabricated from horizontal strips of INVAR, a number of strips being joined end to end to form a run extending the length of the tank; the strips in adjacent runs are welded together along their edges and the ends of the runs are welded to tranverse horizontal strips forming the end faces of the tank. The use of INVAR, which has a very low coefficient of thermal expansion, has the advantage that it is then unnecessary to provide expansion joints to allow for the contraction of the tank when filled with liquid natural gas at −165°C.

According to the present invention, a membrane tank is formed by positioning a stand for a reel of strip material close to the required tank location, fixing the outer end of the reel strip to a traction device, guiding the traction device around a track defining the required tank perimeter and guiding the strip of material pulled from the reel by the traction device over a frame such that the pulled strip forms the perimeter wall of a section of the tank, subsequently guiding the traction device so as to pull a further length of strip material from the reel over a frame section such that the further length of strip material is laid at the side of the previously laid strip to form the perimeter wall of the next section of the tank, and after a strip has been laid at the side of a previously pulled strip, moving a seaming device around the frame to weld the edge of the newly pulled strip to the previously pulled strip, and continuing to pull further strips of material and to weld each to the side of the last pulled strip, until the total width of the side-by-side strips is equal to the required tank dimension in this direction.

In the preferred form, the pulling and seaming of each strip is carried out by a common traction and seaming device which pulls the strip from the reel stand in travelling around the track in one direction and seams the newly laid strip to the last-laid strip in travelling in the opposite direction around the track towards the reel stand. The new strip is laid with its edge overlapping the edge of the last strip and these overlapping edges are seam welded, preferably along two parallel lines, by the seaming device. Alternatively, adjacent edges of the strips may be turned through 90° and flange-welded.

In the case of a double-membrane tank, the outer membrane is formed before the inner membrane. The outer membrane may be formed as a whole before the inner membrane is started, or the fixing of each strip of the outer membrane may be followed by the pulling and fixing of a strip of the inner membrane around a frame of smaller dimensions than that used for the outer membrane. Supports may be fitted behind the outer membrane and between the inner and outer membrane as welding proceeds.

In order that the invention may be better understood, examples of methods and apparatus embodying the invention will now be described with reference to the accompanying drawings, in which.

Figure 1:
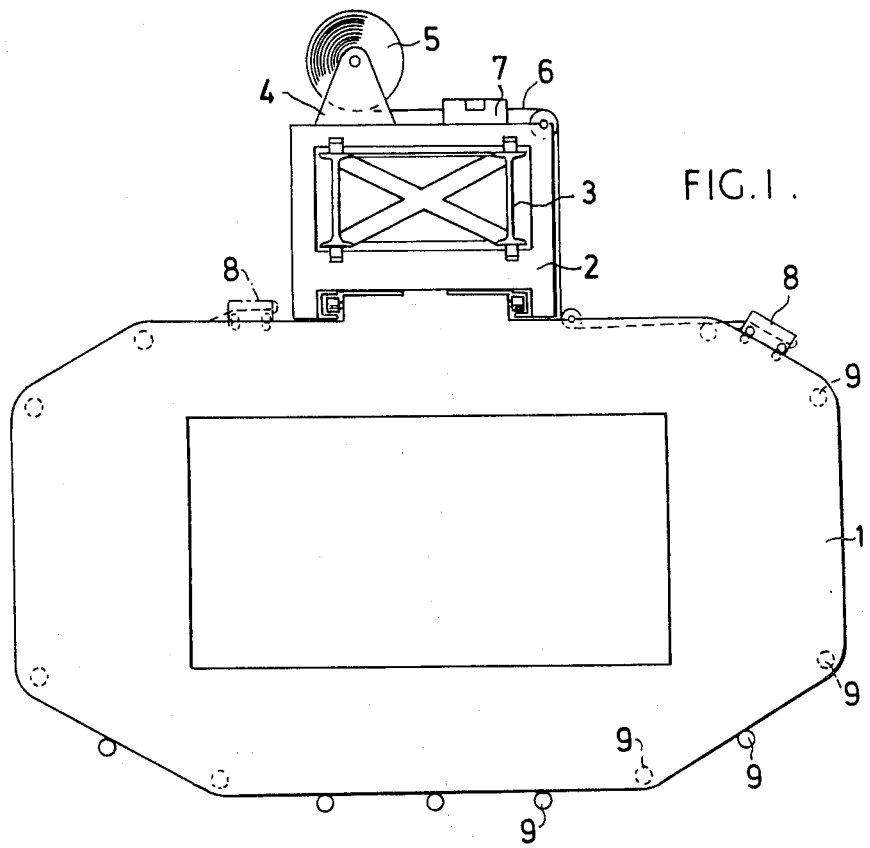
FIG. 1 shows diagrammatically the apparatus required to build a membrane tank.

In FIG. 1, a frame 1 defines the required peripheral shape of the tank to be formed; typically, such a tank may have a height of 50 ft. A block 2 is positioned at the top of the frame and slides on a member 3 which forms part of a gantry mounted above the space in which the tank is to be provided. On the block 2 there is mounted a reel stand 4 carrying a reel 5 of strip material 6. The outer end of this strip material passes across a butt welding machine 7 which is used only when a reel 5 is exhausted and its end has to be joined to the start of a new reel.

The strip material 6 is guided over rollers and its free end is attached to a traction and seaming trolley 8 mounted on wheels which run on a track round the periphery of the frame 1. The trolley is driven by a rack and pinion device on one of a pair of rails forming the track. These rails guide the trolley 8 from the right-hand side of the block 2 in FIG. 1, around the frame periphery to the position shown in dotted lines at the left-hand side of the block 2. As the strip material 6 is pulled by the trolley 8, it is extended over rollers 9 around the frame periphery. On arrival at the position shown in dotted lines in FIG. 1, the end of the strip material is released from the trolley and the trolley then returns around the periphery of the frame, seaming one edge of this strip of material to the free edge of a previously pulled strip.

Figure 2:
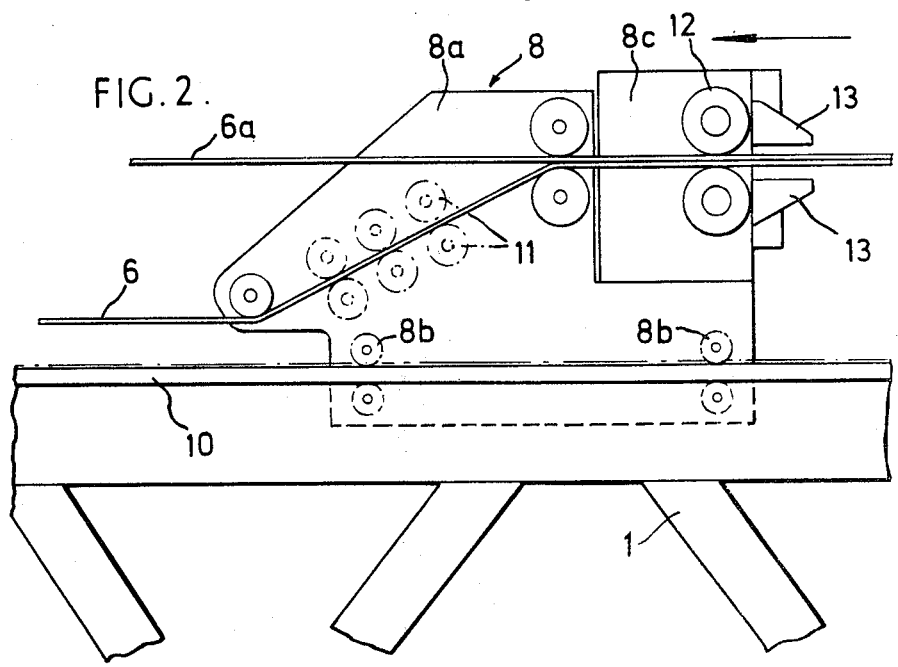
FIG. 2 illustrates in side elevation the traction and seaming device of the apparatus of FIG. 1.
Figure 3:
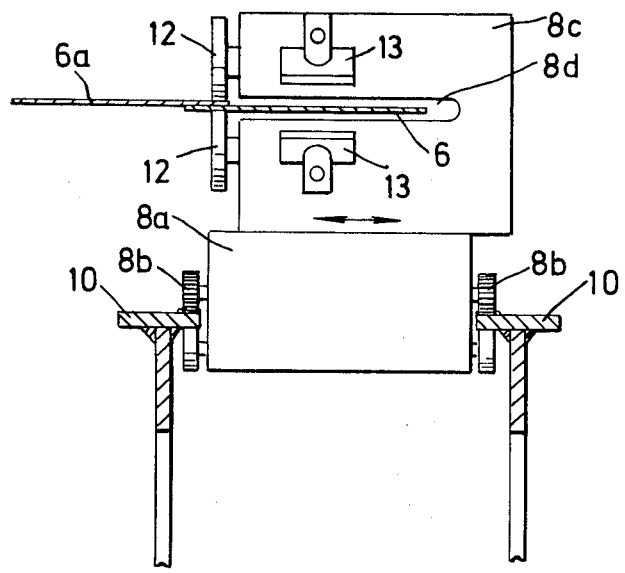
FIG. 3 shows the apparatus of FIG. 2 in end elevation.

FIGS. 2 and 3 show a strip 6 which has just been pulled from the reel and is about to be seamed to a previously pulled and seamed strip 6a and also show in greater detail the trolley 8. The trolley 8 includes a main body portion 8a having wheels 8b running on rails 10 and a portion 8c which carries seam welding wheels 12 and which is transversely adjustable on the portion 8a, as shown in FIG. 3. The portion 8c has a throat 8d of a depth sufficient to accommodate the width of the new strip 6. The trolley carries an electric motor which drives a wheel (or wheels) formed as a pinion co-operating with a rack on the track.

As shown in FIGS. 2 and 3, the trolley has a pair of jaws 13 which hold the strip 6 during the outward journey of the trolley. During the return journey, these jaws are in the open position shown in FIGS. 2 and 3 and the seam welding wheels 12 are brought into operation. During the return journey, the rollers 9 are moved out of the way of the trolley to permit the seaming of the strips to be accomplished.

FIGS. 2 and 3 illustrate the formation of a lap weld between adjacent strips. Alternatively, instead of lap welding the strips, the edges of adjacent strips may be given a flange during the outward or return journey of the trolley and the flanges may be welded together. Rollers to achieve this flanging may be provided on the trolley 8 in the position shown in dotted lines and indicated by the reference 11 in FIG. 2.

Figure 8:
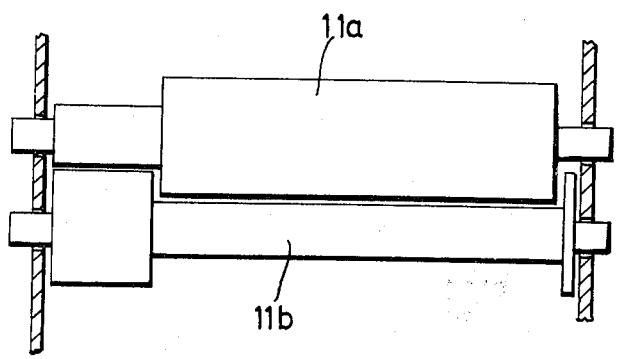
FIG. 8 illustrates the form and arrangement of the flanging rollers.

A pair of flanging rollers is shown in FIG. 8. The major portion of the width of the strip passes between the larger diameter portion 11a of the upper roller and the smaller diameter portion 11b of the lower roller. The end faces of the large diameter portions of the lower roller co-operate with the end faces of the larger diameter portion of the upper roller to bend over the edges of the strip and thereby to form flanges.

Figure 4:
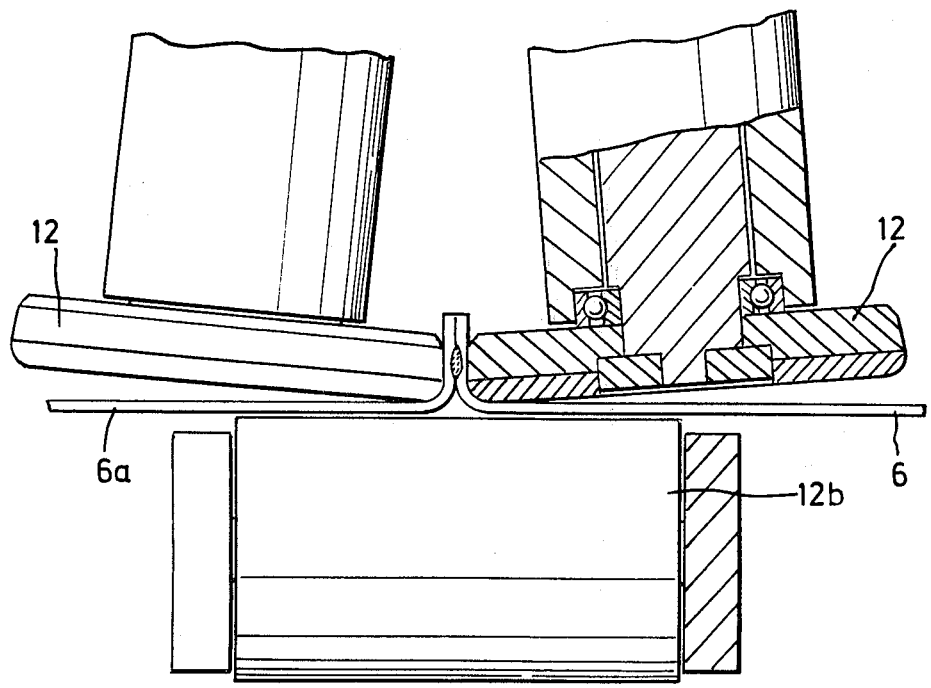
FIG. 4 illustrates apparatus for welding flanged edges of adjacent membrane strips.

For flange welding of the strips, the lap welding rollers 12 shown in the drawing are replaced by flange welding rollers rotating in a plane which is parallel, or almost parallel, to the direction of motion of the strips. As shown in FIG. 4, to facilitate the passage of the flange-welding rollers 12a around the angles of the frame, it is an advantage for their planes of rotation to be symmetrically displaced from the plane of the strips, as shown in the drawing. A support roller 12b acts as a backing for the strips which are being joined.

Figure 5:
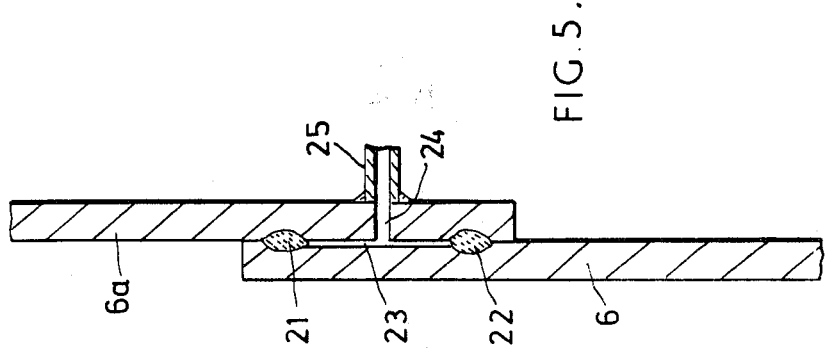
FIG. 5 illustrates a leak-testing arrangement for lap welds between adjacent membrane strips.

Lap welding is not usually employed for welding together sections of tanks for liquid natural gas because of the difficulty of providing an adequate throat depth to bridge the width of a strip of material and because of the problem of inspection and repair of faulty welds. In apparatus of the kind described above, however, the welding machine is adequately supported on a mechanical propelled carriage and consequently an adequate throat depth can be provided. In addition, the quality of the lap welds can be tested in the manner illustrated in FIG. 5. This shows two strips 6 and 6a which have been lap welded along two parallel lines 21 and 22, leaving a space 23 between the weld lines. A hole 24 is drilled to communicate with this space and a short pipe connection 25 facilitates leak testing.

Figure 6:
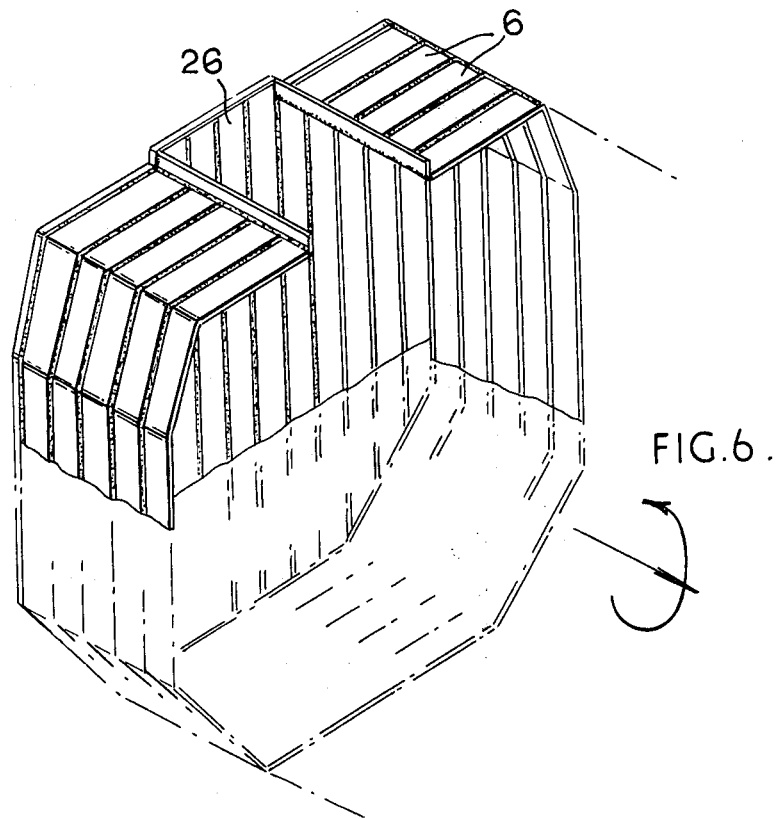
FIG. 6 shows a section of a tank constructed in the manner described with reference to FIG. 1.

FIG. 6 illustrates a partially constructed tank. A number of strips 6 have been extended around the periphery of the required shape and have been sealed together along their adjacent edges. The width of the strip material used may be one metre, for example.

At the end of the tank, the end peripheral strip 6 is joined to an end frame made of thicker material, for example by pulsed TIG and MIG welding. Vertical strips 26 which constitute the end face are attached strip by strip to this frame.

The size required for the frame 1 will vary from tank to tank. Consequently, the frame may conveniently consist of a standard centrepiece together with individual portions fitted around the centrepiece to form the required shape. The distance between the rails of the track on the frame need not be much wider than the width of the strip to be laid. In the case of a tank for a ship, if the ship has an elongate opening extending in the direction of the length of the tank and giving access to the tank space, it may in some cases be possible to lower the frame through this opening and then to twist the frame through a right angle relative to the gantry supporting the frame so that it lies transversely across the space.

For a double membrane tank, the outer strip is put into place first, followed by the inner strip. The positioning of the inner strip requires a frame of smaller dimensions than that used for the outer strip and if the same frame is used, removable sections can be detached once the outer frame strip has been positioned. As the construction of the tank proceeds, insulating material (for example balsa wood or polyurethane) is inserted behind newly laid strips, together with stays extending between the external surface of the membrane tank and an outer vessel such as the side of the ship. These stays may be welded to the outer surface of the membrane tank by a resistance or arc welding process. In addition, support is provided between the inner and outer membranes.

Figure 7:
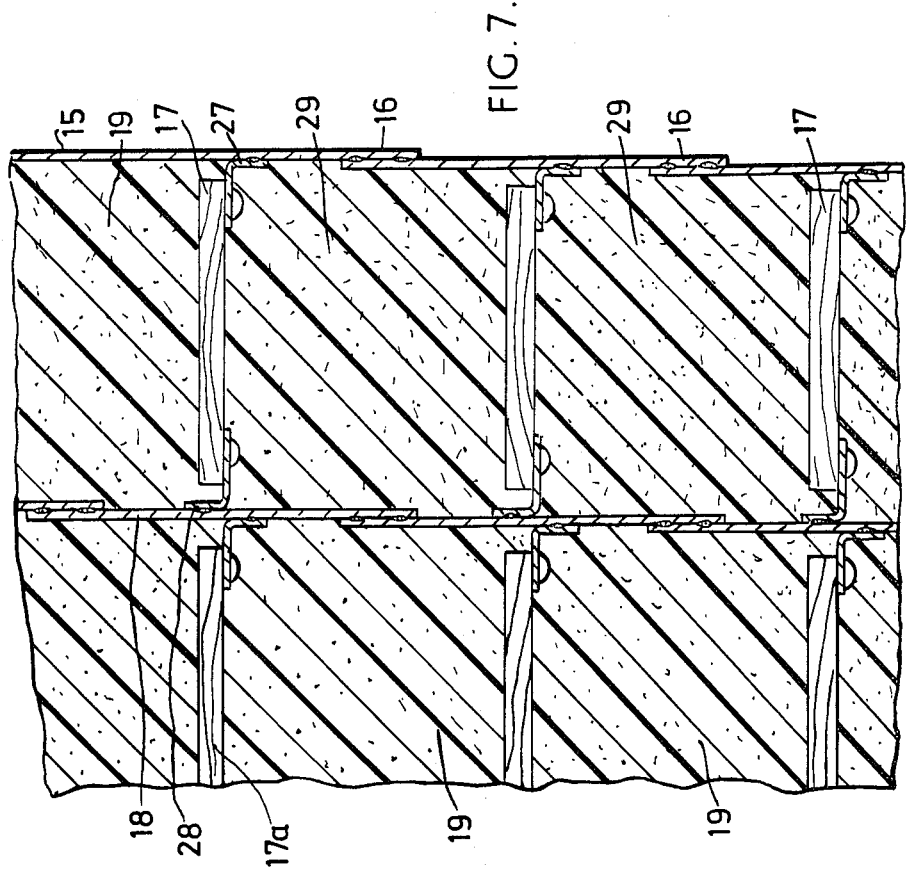
FIG. 7 shows the manner of supporting inner and outer membranes of a tank.

FIG. 7 illustrates this support. In FIG. 7, an inner membrane 15 consisting of strips lap-welded at joints 16 is spaced from an outer membrane 18 by plywood panels 17 fixed to brackets 27 and 28 which are welded to the respective membranes 15 and 18. In a similar way, further plywood panels 17a are fixed between the outer membrane 18 and an external support, such as the side of the ship. The space between the two membranes and between the outer membrane and the side of the ship is filled with the insulating material 29, for example polyurethane foam.

After the seaming of a strip, the frame is moved to the next position for the seaming of the next strip. However, for a tank comprising outer and inner membranes, the frame may be formed with a first track for guiding the traction and seaming trolley around a path which defines the periphery of the outer membrane of the tank to be formed, and a second track for guiding the traction and seaming trolley around a path having cross-sectional dimensions smaller than that of the first track and such that it defines the periphery of the required inner membrane. This second track may be offset with respect to the first track by a distance equal to one or two track widths in a direction perpendicular to the plane of movement of the trolley.

Using the process described, a continuous length of strip material of 75 metres, for example, may be added in each stage of construction. If this length of material cannot be accommodated on a single reel, then material from a further reel can be joined to its end by the butt welder 7 of FIG. 1. The only other joints are the edge seams which are formed by a continuous process, as explained above, and which can be subjected to quality control as the process is carried out. There is no change of welding process for the whole length of a run, a feature which is clearly advantageous in the prevention of leaks from the welded structure. In addition, the supply reel does not have to be moved around the tank but may be fixed at the top of the tank space outside the working area. The space required for the passage of the trolley is much less than would be required for the passage of a reel of the strip material.

Thus, the method described provides easy and rapid handling of the material from which the tank is formed. In addition, the dimensional accuracy of the outer shell or the hull of the ship is not critical, since the track of the frame provides the datum and the frame dimensions are adjustable. Furthermore, the frame itself provides the cat-walks within the tank.

Because the thickness of such a membrane tank is very small, more expensive materials can be used in its manufacture than in the manufacture of a thicker self-supporting tank. This permits such tanks to be used economically when the material is required to have special properties, for example extreme corrosion resistance. For some pusposes where corrosion resistance is required, for example, the tank might be made of titanium or special stainless steel. INVAR is likely to find more widespread use, however, as having the advantage of a very low expansion co-efficient it is particulary suitable for storing liquified gases at low temperatures.

If desired, the traction and seaming device may be arranged to give a corrugation to the strip, the ridges and grooves extending along the length of the strip, to allow for expansion of the tank when it is used. It is also possible to shape the frame to give corrugations or undulations in a direction transverse to the direction of the first-mentioned corrugations.

It will be clear that instead of moving the trolley in a vertical plane, it can be moved in a horizontal plane to lay each strip vertically above the previously laid strips; for example, such a method could be adopted in the case of a simple cylindrical tank.

Although the invention has been described as applied to a ship's tank, it will be clear that the same method of fabrication could be used for a land-based tank for the storage of liquified natural gas or corrosive chemicals.

I claim:

1. A method of forming a membrane tank including the steps of:
   positioning a stand for a reel of strip material close to the required tank location;
   fixing the outer end of the reel strip to a traction device;
   guiding the traction device around a track defining the required tank perimeter and guiding the strip of material pulled from the reel by the device over a frame such that the pulled strip forms the perimeter wall of a section of the tank:
   subsequently guiding the traction device so as to pull a further length of strip material from the reel over a frame section such that the further length of strip material is laid at the side of the previously laid strip to form the perimeter wall of the next section of the tank;
   after a strip has been laid alongside a previously pulled strip, moving a seaming device around the frame to weld the edge of the newly pulled strip to the previously pulled strip;
   and continuing to pull further strips of material and to weld each to the side of the last pulled strip until the total width of the side-by-side strips is equal to the required tank dimension in this direction.

2. A method as defined in claim 1, in which the pulling and seaming of each strip is carried out by a common traction and seaming device which pulls the strip around the required tank periphery on its outward journey from the reel and seams the strip to the last-laid strip on its return journey back to the reel.

3. A method as defined in claim 2, in which the common traction and seaming device runs on a track on a frame of the same cross-sectional shape as the required tank but of smaller dimensions, the frame being located within the position to be occupied by the tank.

4. A method as defined in claim 1, in which flanges are formed on adjacent edges of strips to be joined and are seamed together.

5. A method as defined in claim 4, in which the pulling and seaming of each strip is carried out by a common traction and seaming device which pulls the strip around the required tank periphery on its outward journey from the reel and seams the strip to the last-laid strip on its return journey back to the reel.

6. A method as defined in claim 1, in which as a strip is pulled or seamed it is given a corrugation in which the ridges and grooves extend along the length of the strip.

7. A method as defined in claim 1, in which adjacent edges of strips to be joined together are overlapped and welded.

8. A method as defined in claim 7, in which the overlapped strips are welded together along two parallel lines extending the length of the strips, leaving an unwelded space between the two welding lines, and in which a leak-detecting connection communicates with the space between the two welding lines.

9. A method as defined in claim 1, in which at each end of the tank the end strip is joined to an end frame of thicker material, the end faces of the tank being formed of parallel strips of the membrane material attached to the said end frame.

10. A method as defined in claim 1, in which as each reel of the membrane material is exhausted, its end is welded to the outer end of a fresh reel.

11. Apparatus for carrying out the method according to claim 1, comprising:
    a reel stand for supporting a reel of strip material;
    a traction device for pulling strip material from a reel on the reel stand;
    a frame shaped in accordance with the cross-sectional shape of the required tank and including a track for guiding the traction device around the frame and supports for supporting strip material extended around the frame by the passage of the traction device; and a seaming device movable around the said track for welding adjacent edges of side-by-side strips extended around the frame by the traction device.

12. Apparatus as defined in claim 11, in which the traction device and the seaming device are mounted on a common trolley and in which the frame includes rails for guiding the trolley.

13. Apparatus as defined in claim 12, in which one of the rails is formed with a rack and the trolley is provided with a pinion co-operating with the rack.

14. Apparatus as defined in claim 11, in which the seaming device includes a pair of welding rollers arranged for lap-welding the side-by-side strips, the seaming device having a "throat" space to accommodate the newly laid strip.

15. Apparatus as defined in claim 11, in which the seaming device includes a pair of welding rollers arranged for flange welding the upturned edges of side-by-side strips.

* * * * *